United States Patent [19]
Hanela

[11] 3,904,093
[45] Sept. 9, 1975

[54] SPARE TIRE CARRIER

[76] Inventor: Harley E. Hanela, Star Rt., Virginia, Minn. 55792

[22] Filed: Sept. 11, 1972

[21] Appl. No.: 287,964

[52] U.S. Cl............................. 224/42.21; 224/42.23
[51] Int. Cl............................................. B62d 43/04
[58] Field of Search........... 224/42.21, 42.06, 42.12, 224/42.23, 42.24, 42.35, 42.44; 214/451, 452, 453, 454, 450, DIG. 10; 248/147

[56] References Cited
UNITED STATES PATENTS

| | | | |
|---|---|---|---|
| 1,879,304 | 9/1932 | Kennedy et al. | 214/451 |
| 2,028,945 | 1/1936 | Morrison | 296/37.2 UX |
| 3,187,914 | 6/1965 | Péras | 224/42.21 X |
| 3,292,795 | 12/1966 | Chappell | 248/147 X |
| 3,561,710 | 2/1971 | Cummings | 248/147 |

Primary Examiner—Robert J. Spar
Assistant Examiner—Jerold M. Forsberg
Attorney, Agent, or Firm—Merchant, Gould, Smith & Edell

[57] ABSTRACT

A spare tire carrier for use on the underside of a truck vehicle is disclosed in which the carrier is releasably attached at one end thereof to the rear underside of the truck vehicle and the carrier is attached at the other end thereof at the carrier sides by a pair of spaced apart linkage arms. The spaced apart linkage arms cooperate with the body of the carrier and a tension spring to define a toggle switch. The linkage arms are constructed so that there may be a limited amount of rotation thereof and there is a four bar mechanism for constraining the limits of rotation of the linkage arm with respect to the tire carrier. The carrier can be moved from a stored position against the underside of a vehicle to an open position near the ground and out from under the vehicle by a slight pull outwardly of the carrier, and the carrier can be returned to its stored position by a slight movement inwardly of the carrier.

11 Claims, 5 Drawing Figures

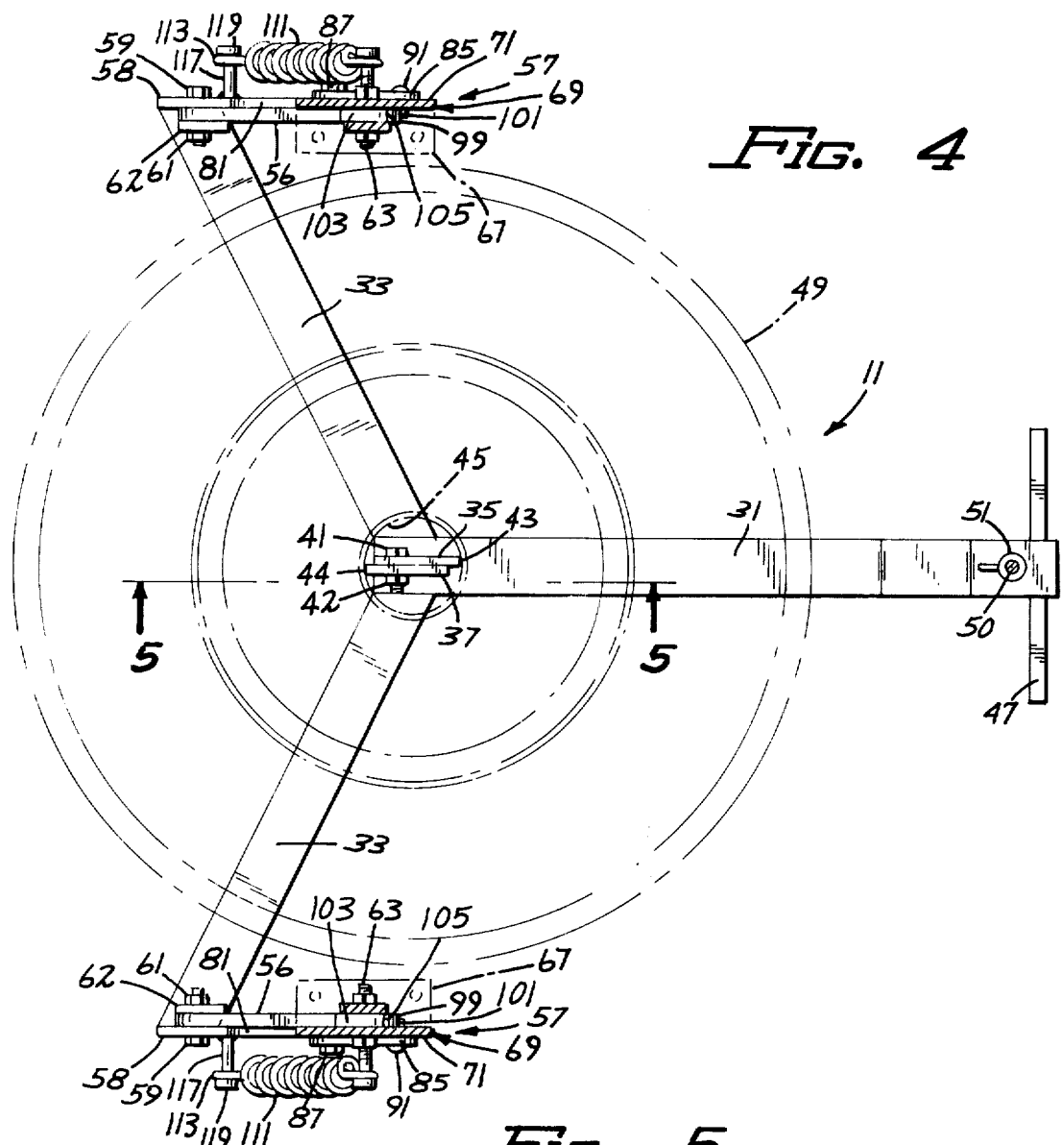
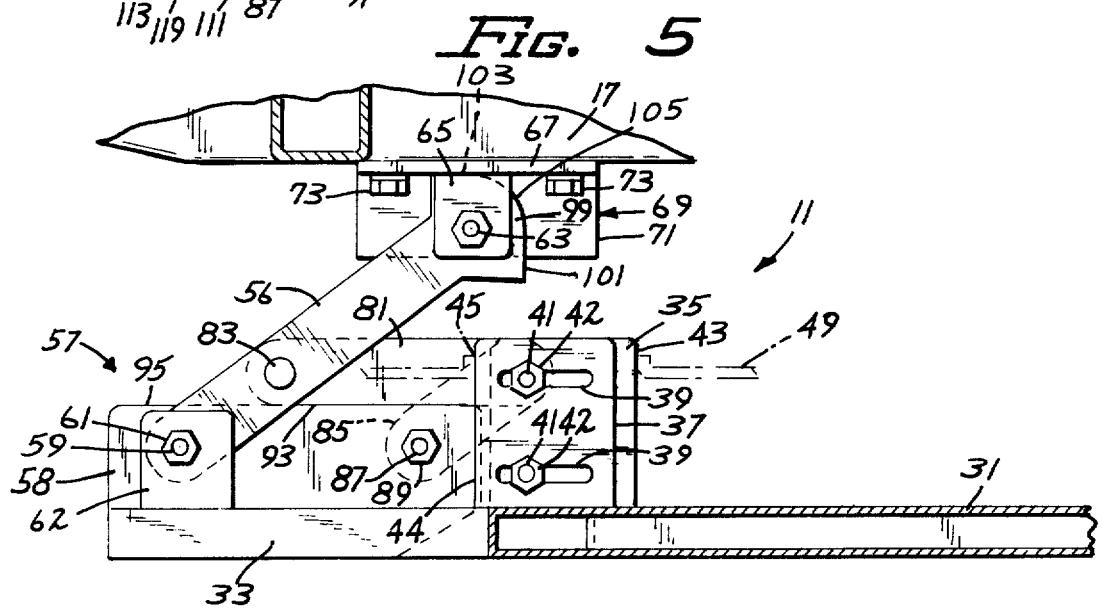

3,904,093

SPARE TIRE CARRIER

BACKGROUND OF THE INVENTION

1. Field of the Invention

The present invention relates generally to an improved spare tire carrier for use with pick up trucks, station wagons, or other type vehicles wherein it is desirable to store a spare tire beneath the automobile, and more particularly relates to a simple and expedient carrier utilizing a toggle mechanism that can be raised and lowered with a minimum of effort.

2. Description of the Prior Art

Heretofore, it has been difficult to manipulate a spare tire carrier located at the underside of the vehicle body. Perhaps the spare tire carrier which provides for the greatest ease in gaining accessibility to the tire is disclosed in U.S. Pat. No. 3,485,399 issued to A. M. Hebnes. However, Hebnes' spare tire carrier cannot be used with vehicles having leaf springs but is constrained to be used with vehicles having coil springs since the mechanism of Hebnes operates in the location where leaf springs are located.

OBJECTS AND SUMMARY OF THE INVENTION

Accordingly, it is an object of the present invention to provide a new and improved spare tire carrier which is easier to operate and also can be used with vehicles having any type of suspension system.

In accordance with the invention, a spare tire carrier is provided having a wheel supporting brace with a forward end and a pair of spaced apart sides rearward of the forward end. The brace contains means for releasably attaching the forward end thereof to the underside of the vehicle and linkage means rotatably attached to each of said sides of said brace for supporting the remainder of said brace. A toggle switch is provided by biasing means attached to the underside of the vehicle and extending to the wheel supporting brace. Means constraining the extent of rotation of the linkage means with respect to the brace and means constraining the extent of rotation of the linkage means with respect to the underside of the vehicle provides for a carrier which can be moved from a stored position against the underside of the vehicle to an open position on the ground and out from under the vehicle by slight pulling outwardly of the carrier, and a carrier which can be returned to its stored position beneath the underside of a vehicle by a slight movement inwardly of the carrier.

BRIEF DESCRIPTION OF THE DRAWINGS

In the drawings:

FIG. 4 is a view of the spare tire carrier taken along line 4—4 of FIG. 1; and

FIG. 5 is a view of the spare tire carrier taken along line 5—5 of FIG. 4.

DETAILED DESCRIPTION OF THE DRAWINGS

Figure 1:
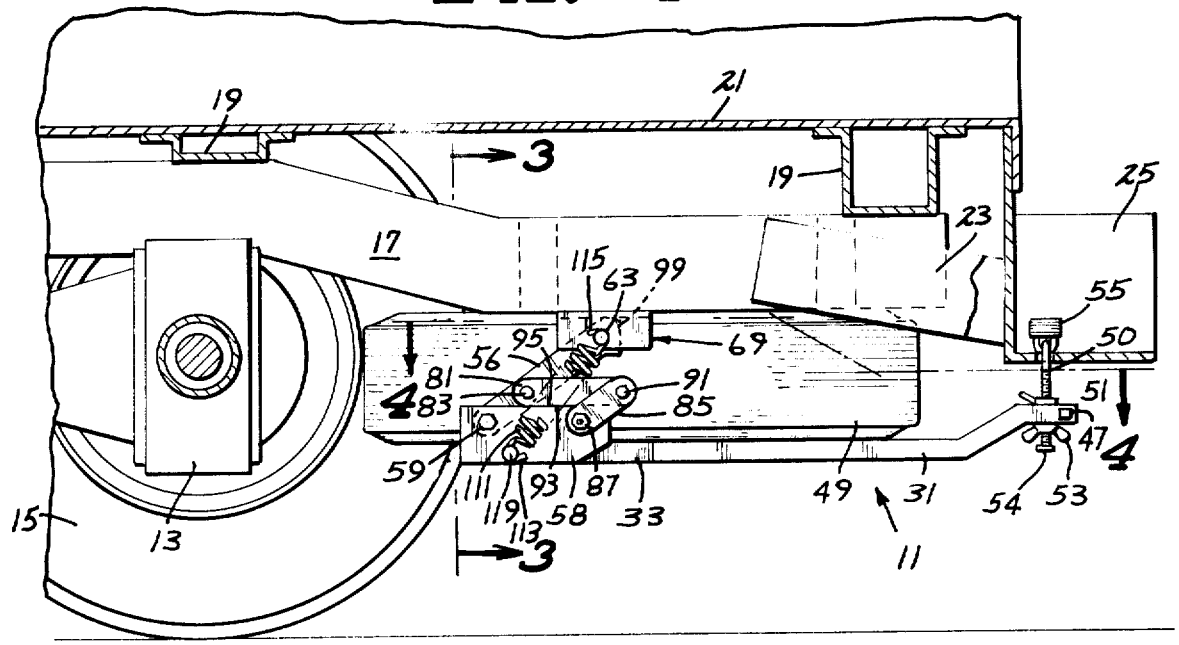
FIG. 1 is a view of the spare tire carrier of the present invention attached to the underside of a vehicle which is shown in section.

Referring now to the drawings, and in particular to FIG. 1, the spare tire carrier, designated 11, can be seen attached to the underside of a truck vehicle. Generally, the truck vehicle includes a differential 13 mounted between wheels 15 (one of which is shown). Leaf springs or coil springs (not shown) mount a frame 17 above the differential 13. The frame has gussets 19 which carry the truck bed 21. Near the rearward end of the truck the frame 17 includes a bumper bracket 23 for securing a bumper 25 to the truck vehicle.

Referring now additionally to FIG. 4, the spare tire carrier 11 can be seen in greater detail. The carrier 11 includes a forward carriage arm or tongue 31 secured, as by welding, to a pair of rearwardly and outwardly diverging leg portions 33. At the junction of the tongue 31 and legs 33 an upwardly directed bracket 35 is secured to the tongue 31 as by welding. Referring additionally to FIG. 5, an adjustable bracket 37 is shown located proximate the bracket 35, and the bracket 37 has a pair of horizontally extending vertically spaced apart slotted holes 39. Threaded bolts 41 extend through a hole within bracket 35 and through the slots 39 within bracket 37 for adjusting bracket 35 with respect to bracket 37 upon the proper loosening of a retaining nut 42. By reference to FIGS. 4 and 5 it can be seen that the outside edges 43 and 44 of the brackets 35 and 37 respectively can thus be adjusted in order to fit snuggly within the inside hole 45 of a tire wheel (shown in broken lines in FIG. 4). At the forward end of the tongue 31, a handle 47 is provided extending perpendicularly with tongue 31 for ease of movement of the tire carrier 11 with respect to the truck vehicle.

With the spare tire carrier 11 in its stored position, seen in FIG. 1, a spare tire 49 is supported by the carrier 11 with the carrier 11 having three basic points of attachment to the underside of the vehicle. Near the rear of the vehicle the tongue 31 of the carrier 11 is secured to the underside of the bumper by means of a bolt 50 extending through a hole in the bumper 25 and through a hole in the tongue 31. A lock nut 51 and a wing nut 53 may be screwed together in order to retain the tongue 31 in a particular position with respect to the bolt 50. The bottom end of the bolt 49 contains a permanent flange 54 and the top end of the bolt 49 has a loop for the insertion of a lock 55 therethrough for locking the tire carriage 11 with respect to the vehicle.

Figure 3:
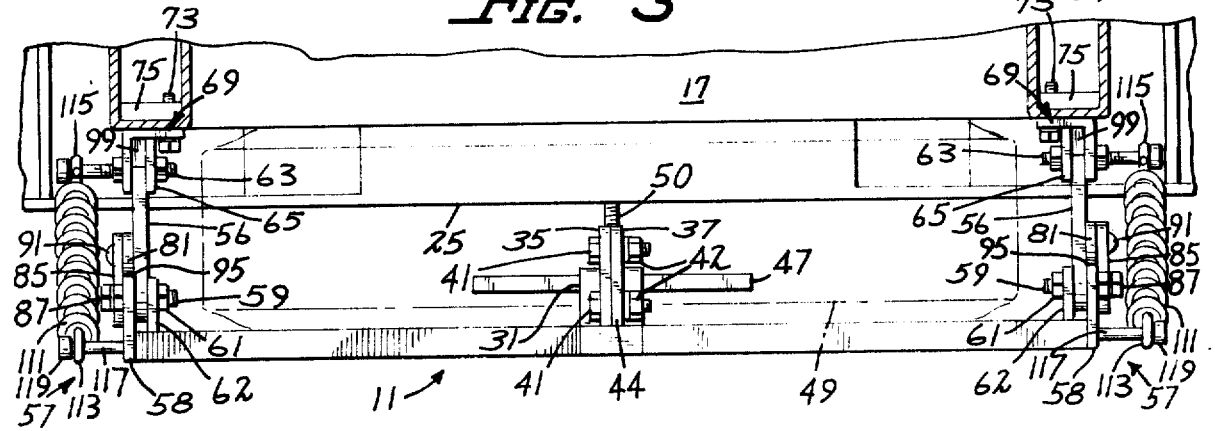
FIG. 3 is a view of the spare tire carrier taken along line 3—3 of FIG. 1.

Referring now additionally to FIG. 3, it can be seen that the rearward end of the carriage 11 is secured to the underside of the vehicle by means of spaced apart linkage arms 56 located on each side 57 of the tire carrier 11. For simplicity, only one side 57 of the carriage 11 will be described since the second side is the same in my preferred embodiment. It should be understood, however, that both sides 57 do not have to be identical. Linkage arm 56 is rotatably attached to a side plate 58 inwardly therefrom. The side plate 58 is fixedly attached (as by welding) to the legs 33. In order to lend stability an upwardly directed plate 62 is attached, as by welding, to the legs 33 inwardly of the arm 56. The plate 62 has a hole therethrough. The rotatable attachment of the arm 56 to the plates 58 and 62 may be by means of a simple bolt 59 extending through the holes in the plate 57 and flange 62 and a nut 61.

The upper end of the linkage arm 56 is rotatably attached to the underside of the vehicle by means of a bolt 63 extending through a hole within the arm 56 and additionally through a hole in a strengthening plate 65 which is welded to a horizontally extending arm 67 of an L-shaped bracket 69, and through a hole in a vertically extending leg 71 of L-shaped bracket 69. The L-shaped bracket 69 is attached to the frame 17 of the vehicle by bolts 73 extending through holes in the horizontal leg 67 of the L-shaped bracket 69 and through holes in the frame 17 and attached by nuts 75.

Located outwardly from arm 56 arm 81 extends longitudinally parallel with respect to plate 58. Arm 81 is rotatably secured to arm 56 by means of a pin 83 extending through arms 56 and 81.

A third arm 85 is located exterior of plate 58 and secured to plate 58 by means of a bolt 87, extending through a hole in plate 58 and arm 85, and a nut 89. The second end of arm 85 is attached to arm 81 by means of a pin 91 extending through arms 85 and 81. It can be seen that by the establishment of the parallelogram defined by the plate 58 in cooperation with the arms 56, 81 and 85, the rotation of plate 58 with respect to arm 56 can be limited to a definite arc. In FIGS. 1 and 5 the smallest angle between plate 58 and arm 56 is shown wherein the bottom edge 93 of arm 81 is abutting the top edge 95 of plate 58.

Arm 56 has at its top end thereof a head portion 99 having a pair of flat stop members 101 and 103 separated by a curved portion 105. With this configuration for the head 99 the arm 56 is free to rotate with respect to the underside of the vehicle from the position shown in FIGS. 1 and 5 wherein the stop 103 is abutting against the horizontally extending arm 67 of flange 69 to a second position, shown as position B in FIG. 2, wherein the stop 101 abuts the arm 67 of flange 69.

Referring now in particular to FIGS. 1 and 4 there can be seen a pair of tension springs 111 which cooperate with the arms 56 and the plates 58 to form a toggle switch. The tension spring 111 has an eye 113 at the bottom end thereof and an eye 115 at the top end thereof. A post 117 is attached, as by welding, to plate 58 for insertion through the eye 113 of spring 111 to secure the bottom of the spring. A nut or welded-on washer 119 may be used to permanently retain the spring 111 to the post 117. The second end of the spring 111 is secured to the bracket 69 and thus the frame 17 of the vehicle by means of the bolt 63. It should be appreciated that the spring 111 does not have to be secured at the same point of rotation as in the arm 56 in order to form an effective toggle switch. For instance, the eye 115 could be secured to a point on arm 56 or to some point directly on frame 17. All that is required of the toggle switch is that as plate 58 is rotated with respect to arm 56 there is an arc of rotation whereby the force required to rotate increases and then an immediate arc of rotation where the force required to further rotate plate 58 with respect to arm 56 decreases.

Figure 2:
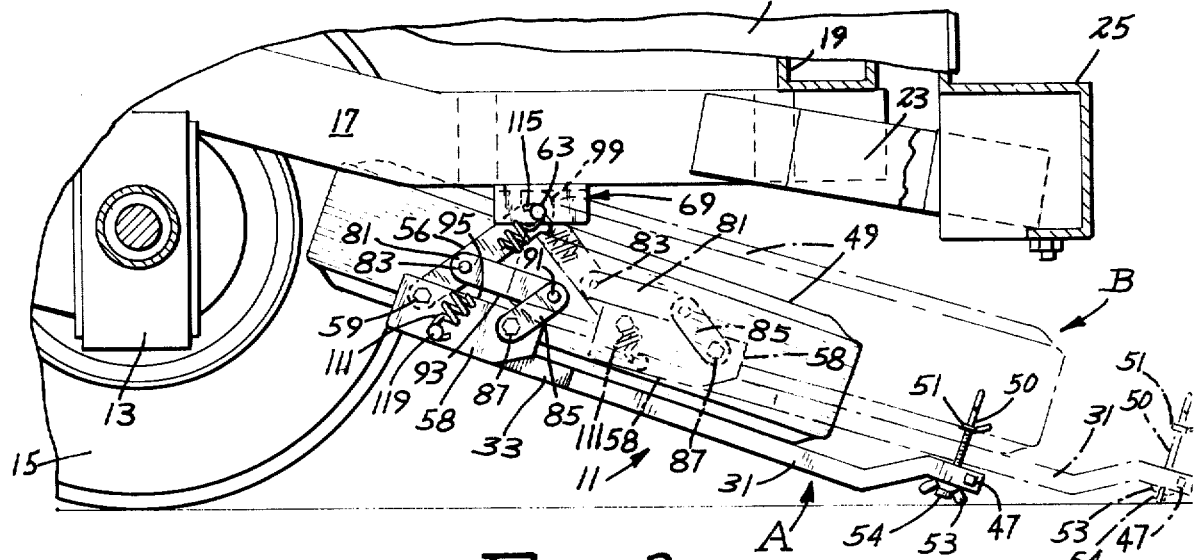
FIG. 2 is a view similar to FIG. 1 with the spare tire carrier shown in various positions of usage.

In operation, in order to remove the tire 49 from the tire carrier 11 the lock 55 is unlocked and removed from the eye of the bolt 50 so that the tongue 31 can be moved downwardly so as to bring the tire 49 to a position low enough to clear the bumper 25 of the vehicle. The tongue 31 may be dropped to the position A as shown in FIG. 2 and then pulled outwardly by handle 47 to position B or the tongue 31 may be brought directly to position B by a path wherein the tire 49 does not abut the bumper 25. The tongue 31 is brought downwardly to position A without needing to use downward force on handle 47. It should be appreciated that the stop 103 upon the head portion 99 of arm 56 prevents the entire carrier 11 from rotating to the left, as seen in FIG. 2, about the bolt 63 about which the spring 111 and lever 56 are attached to the frame 17 when the tongue 31 is unlocked and brought downwardly. As the carrier is brought forwardly to the position B its movement is resisted by the spring 111.

As seen in position A of FIG. 2 plate 58 has rotated sufficiently with respect to arm 56 such that the arm 81 is no longer abutting the plate 58. As the stop 101 abuts bracket 69 and the plate 58 rotates with respect to the arm 56 by pulling outwardly of the tongue 31 to the position B the spring 111 tends to align with the arm 56. With the particular configuration of the toggle switch which I have disclosed, the maximum tension on the spring 111 exists when the spring 111 is in line with arm 56. As tongue 31 is brought to a position just prior to position B the spring 111 aligns with the arm 56. When the tongue 31 is brought to the position B the spring 111 moves past center on the arm 56 and the arm 81 abuts the plate 58. The unit is then locked in its downward position B. With the tire carrier in position B the tire can easily be removed from the carrier.

In order to return the tire carrier 11 to its stored position, as seen in FIG. 1, the tongue 31 is merely lifted and then the carriage swings up to its stored position. Since stop 101 is abutting arm 67 of flange 69, upon lifting of the tongue 31 there is a rotation of plate 58 with respect to arm 56. This rotation brings spring 111 over center with respect to arm 56 and then creates a force aiding in the movement of the carriage 11 rearwardly and upwardly. The stop 103 abutting against arm 67 of bracket 69 prevents the tire carrier 11 from rotating to the left, as seen in FIG. 1, to a position further to the left than shown in FIG. 1; and, the abutment of edge 93 of arm 81 against edge 95 of plate 58 prevents spring 111 from moving the carrier 11 upwardly and to the right, as seen in FIG. 1.

I claim:

1. A spare tire carrier for use on the underside of a vehicle comprising:

a. a wheel supporting brace having a forward end and a pair of sides;
   b. means for releasably attaching said forward end of said brace to said underside of said vehicle;
   c. linkage means;
   d. means attaching a first end of said linkage means to one of said brace sides rearward of said brace forward end for rotation with respect to said brace;
   e. means rotatably attaching a second end of said linkage means to said underside of said vehicle;
   f. means constraining the limits of rotation of said linkage means with respect to said underside of said vehicle between a first position of said linkage means with respect to said underside of said vehicle and a second position of said linkage means with respect to said underside of said vehicle;
   g. means associated with said brace constraining the limits of rotation of said brace side with respect to said linkage means between a first relative position of said brace side and linkage means and a second relative position of said brace side and linkage means; and
   h. a spring means for imparting a force, cooperatively engaged with said linkage means and attached to said brace side, such that as said brace side is rotated with respect to said linkage means between said first relative position and said second relative position there is an arc of rotation whereby the force required to rotate increases and then an immediate arc of rotation whereby said brace side rotates with respect to said linkage means by said spring force bringing said brace side and linkage means to said second relative position, and such that as said brace side is rotated with respect to said linkage means between said second relative position and said first relative position there is an arc of rotation whereby the force required to rotate increases and then an immediate arc of rotation whereby said brace side rotates with respect to said linkage means by said spring force bringing said brace side and linkage means to said first relative position.

2. The spare tire carrier of claim 1 wherein said biasing means acts at a first end thereof against said underside of said vehicle and at a second end thereof against said brace side rearward of said forward end.

3. The spare tire carrier of claim 2 wherein said biasing means is a tension spring attached at said first end thereof to said underside of said vehicle by said means rotatably attaching a second end of said linkage means to said underside of said vehicle and attached at said second end thereof to said wheel supporting brace side rearward of said brace forward end.

4. The spare tire carrier of claim 1 wherein said means constraining the limits of rotation of said linkage means with respect to said brace means, includes:
 a. second linkage means;
 b. means rotatably attaching a first end of said second linkage means to said linkage means;
 c. third linkage means;
 d. means rotatably attaching a first end of said third linkage means to said brace side; and
 e. means rotatably attaching a second end of said third linkage means with a second end of said second linkage means for parallel movement of said second linkage means with respect to said wheel supporting brace side and for abutment of said second linkage means with said wheel supporting brace side upon rotation of said linkage means with respect to said wheel supporting brace side to an outer limit within a predetermined range.

5. The spare tire carrier of claim 1 wherein said means constraining the limits of rotation of said linkage means with respect to said underside of said vehicle includes a pair of spaced apart stop members located upon said linkage means at said second end thereof for abutment against said underside of said vehicle for constraining rotation of said linkage means with respect to said underside of said vehicle within a predetermined range.

6. A spare tire carrier for use on the underside of a vehicle, comprising:
 a. a wheel supporting brace having a forward end and a pair of spaced apart sides;
 b. means for releasably attaching said forward end of said brace to said underside of said vehicle;
 c. a pair of linkage means;
 d. means attaching a first end of each of said linkage means to each of said brace sides rearward of said brace forward end for rotation with respect to said brace;
 e. means rotatably attaching a second end of each of said linkage means to said underside of said vehicle;
 f. means constraining the limits of rotation of said linkage means with respect to said underside of said vehicle between a first position of said linkage means with respect to said underside of said vehicle and a second position of said linkage means with respect to said underside of said vehicle;
 g. means associated with said brace constraining the limits of rotation of said brace sides with respect to said linkage means between a first relative position of said brace sides and linkage means and a second relative position of said brace sides and linkage means; and
 h. a spring means for imparting a force, cooperatively engaged with said linkage means and attached to said brace sides, such that as said brace sides are rotated with respect to said linkage means between said first relative position and said second relative position there is an arc of rotation whereby the force required to rotate increases and then an immediate arc of rotation whereby said brace sides rotate with respect to said linkage means by said spring force bringing said brace sides and linkage means to said second relative position, and such that as said brace sides are rotated with respect to said linkage means between said second relative position and said first relative position there is an arc of rotation whereby the force required to rotate increases and then an immediate arc of rotation whereby said brace sides rotate with respect to said linkage means by said spring force bringing said brace sides and linkage means to said first relative position.

7. The spare tire carrier of claim 6 wherein said pair of biasing means act at first ends thereof against said underside of said vehicle and at second end thereof against each of said brace sides rearward of said forward end.

8. The spare tire carrier of claim 7 wherein said pair of biasing means are tension springs attached to said first ends thereof to said underside of said vehicle by said means rotatably attaching said second ends of each of said linkage means to said underside of said vehicle, and attached at said second ends thereof to said wheel supporting brace side rearward of said brace forward end.

9. The spare tire carrier of claim 6 wherein said means constraining the limits of rotation of said linkage means with respect to said brace means, includes:
 a. a second pair of linkage means;
 b. means rotatably attaching a first end of each of said second pair of linkage means to said linkage means;
 c. a third pair of linkage means;
 d. means rotatably attaching a first end of each of said third pair of linkage means to each of said brace sides; and
 e. means rotatably attaching a second end of each of said third linkage means with a second end of each of said second linkage means for parallel movement of said second linkage means with respect to said wheel supporting brace sides and for abutment of said second linkage means with said wheel supporting brace sides upon rotation of said linkage means with respect to said wheel supporting brace sides to an outer limit within a predetermined range.

10. The spare tire carrier of claim 6 wherein said means constraining the limits of rotation of said linkage means with respect to said underside of said vehicle includes a pair of spaced apart stop members located upon each of said linkage means at said second ends thereof for abutment against said underside of said vehicle for constraining rotation of said linkage means with respect to said underside of said vehicle within a predetermined range.

11. A spare tire carrier for use on the underside of a vehicle, comprising:
   a. a longitudinally extending wheel supporting brace having a tongue and a pair of spaced-apart sides;
   b. means for releasably attaching said tongue of said brace to said underside of said vehicle;
   c. a first pair of linkage means;
   d. means attaching a first end of each of said first pair of linkage means to each of said sides of said wheel supporting brace rearward of said tongue for rotation with respect to said brace;
   e. means rotatably attaching a second end of said first pair of linkage means to said underside of said vehicle;
   f. a pair of tension springs each attached at one end thereof to said underside of said vehicle by said means rotatably attaching a second end of each of said first pair of linkage means to said underside of said vehicle;
   g. means attaching a second end of said tension spring to said wheel supporting brace side rearward of said brace forward end at a position on said brace such that as said brace is rotated with respect to said linkage means there is an arc of rotation whereby the force required to rotate increases and then an arc of rotation whereby said side braces rotate with respect to said linkage means by said spring force;
   h. a second pair of linkage means;
   i. means rotatably attaching a first end of each of said second linkage means to each of said first linkage means;
   j. a third pair of linkage means;
   k. means rotatably attaching a first end of each of said third linkage means to each of said brace sides;
   l. means rotatably attaching a second end of each of said third linkage means with a second end of each of said second linkage means for parallel movement of said second linkage means with respect to said wheel supporting brace sides and for abutment of said second linkage means with said wheel supporting sides upon rotation of said first linkage means with respect to said wheel supporting brace sides a predetermined range; and
   m. a pair of spaced-apart stop members located upon each of said first linkage means at said second ends thereof for abutment against said underside of said vehicle for constraining the rotation of said first linkage means with respect to said underside of said vehicle within a predetermined range.

* * * * *